(12) United States Patent
Bedford et al.

(10) Patent No.: US 8,171,709 B1
(45) Date of Patent: May 8, 2012

(54) MOWER BAFFLE SYSTEM

(75) Inventors: Richard Lee Bedford, Watertown, WI (US); Anthony S. Weber, Lake Mills, WI (US)

(73) Assignee: Schiller Grounds Care, Inc., Southampton, PA (US)

(*) Notice: Subject to any disclaimer, the term of this patent is extended or adjusted under 35 U.S.C. 154(b) by 0 days.

(21) Appl. No.: 13/283,141

(22) Filed: Oct. 27, 2011

Related U.S. Application Data

(60) Provisional application No. 61/407,075, filed on Oct. 27, 2010.

(51) Int. Cl.
*A01D 67/00* (2006.01)
(52) U.S. Cl. ....................................... 56/320.2
(58) Field of Classification Search .............. 56/320.2, 56/320.1, 6
See application file for complete search history.

(56) References Cited

U.S. PATENT DOCUMENTS

| | | |
|---|---|---|
| 2,711,624 A | 6/1955 | Crump |
| 2,898,723 A | 8/1959 | Goodall |
| 3,283,486 A | 11/1966 | Marek |
| 3,469,376 A | 9/1969 | Bacon |
| 3,485,018 A | 12/1969 | Beckering |
| 3,680,292 A | 8/1972 | McCanse |
| 3,795,094 A | 3/1974 | Mollen et al. |
| 3,916,606 A | 11/1975 | Brudnak, Jr. et al. |
| 4,055,036 A | 10/1977 | Kidd |
| 4,114,353 A | 9/1978 | Ansbaugh et al. |
| 4,154,455 A | 5/1979 | Murphy |
| 4,226,074 A | 10/1980 | Mullet et al. |
| 4,318,268 A | 3/1982 | Szymanis |
| 4,364,221 A | 12/1982 | Wixom |
| 4,532,755 A | 8/1985 | Schemelin et al. |
| 4,543,773 A | 10/1985 | Reilly |
| 4,779,406 A | 10/1988 | Schroeder |
| 4,787,195 A | 11/1988 | Wenzel |
| D305,336 S | 1/1990 | Berg et al. |
| 4,897,987 A | 2/1990 | Spalla et al. |
| 4,916,887 A | 4/1990 | Mullet et al. |

(Continued)

FOREIGN PATENT DOCUMENTS

DE 29512057 U1 11/1995

(Continued)

OTHER PUBLICATIONS

Installation Instruction Sheet for Ransomes Baffle Kit No. 970115, 5 pages.

(Continued)

*Primary Examiner* — Arpad Fabian-Kovacs
(74) *Attorney, Agent, or Firm* — Panitch Schwarze Belisario & Nadel LLP

(57) ABSTRACT

A multiblade lawn mower including a mower deck having a plurality of cutting blades rotatably disposed therein. A first baffle is positioned within the mower deck between the cutting blades and a front wall of the mower deck and extends substantially continuously between the sides of the mower deck. A second baffle is positioned in the mower deck rearwardly of the cutting blades. The first and second baffles each include a plurality of arcuate baffle portions which define at least one open throat portion therebetween. The first baffle includes at least first, second and third arcuate portions. A third baffle is positioned within the mower deck and extends from adjacent a discharge opening of the mower deck into a circular path defined by peripheral ends of a cutting blade adjacent the discharge opening.

20 Claims, 3 Drawing Sheets

U.S. PATENT DOCUMENTS

| | | | |
|---|---|---|---|
| 4,938,011 A | 7/1990 | Pernia | |
| 4,958,484 A | 9/1990 | Busboom | |
| 4,967,543 A | 11/1990 | Scag et al. | |
| 4,991,382 A | 2/1991 | Scag | |
| 4,998,948 A | 3/1991 | Osterling | |
| 5,035,108 A | 7/1991 | Meyer et al. | |
| 5,042,239 A | 8/1991 | Card | |
| 5,090,183 A | 2/1992 | Thorud et al. | |
| 5,129,217 A | 7/1992 | Loehr | |
| 5,133,176 A | 7/1992 | Baumann et al. | |
| 5,155,985 A | 10/1992 | Oshima et al. | |
| 5,191,756 A | 3/1993 | Kuhn | |
| 5,205,112 A | 4/1993 | Tillotson et al. | |
| 5,210,998 A | 5/1993 | Hojo et al. | |
| 5,212,938 A | 5/1993 | Zenner et al. | |
| 5,239,810 A | 8/1993 | Gugel | |
| 5,249,411 A | 10/1993 | Hake | |
| 5,267,429 A | 12/1993 | Kettler et al. | |
| 5,305,589 A | 4/1994 | Rodriguez et al. | |
| 5,337,543 A | 8/1994 | Kitamura et al. | |
| 5,337,545 A | 8/1994 | Butler | |
| 5,355,661 A | 10/1994 | Tomiyama | |
| 5,404,697 A | 4/1995 | Dewey | |
| 5,457,947 A | 10/1995 | Samejima et al. | |
| 5,465,564 A | 11/1995 | Koehn et al. | |
| 5,481,857 A | 1/1996 | Umemoto et al. | |
| 5,483,790 A | 1/1996 | Kuhn et al. | |
| 5,488,821 A | 2/1996 | McCunn et al. | |
| 5,501,636 A | 3/1996 | Janke et al. | |
| 5,507,138 A | 4/1996 | Wright et al. | |
| 5,518,079 A | 5/1996 | Zvolanek | |
| 5,609,011 A | 3/1997 | Kuhn et al. | |
| 5,628,171 A | 5/1997 | Stewart et al. | |
| 5,765,346 A | 6/1998 | Benter et al. | |
| 5,791,132 A | 8/1998 | Wiedenmann | |
| 5,826,416 A | 10/1998 | Sugden et al. | |
| 5,832,708 A | 11/1998 | Sugden | |
| 5,845,475 A | 12/1998 | Busboom et al. | |
| 5,865,018 A | 2/1999 | Wanie | |
| 5,890,354 A | 4/1999 | Bednar | |
| 5,894,717 A | 4/1999 | Yamashita et al. | |
| 5,987,863 A | 11/1999 | Busboom et al. | |
| D424,071 S | 5/2000 | Bickford et al. | |
| 6,148,595 A | 11/2000 | Rabe et al. | |
| 6,192,666 B1 | 2/2001 | Sugden et al. | |
| 6,571,544 B1 | 6/2003 | Buss et al. | |
| 6,609,358 B1 | 8/2003 | Schmidt et al. | |
| 6,619,319 B1 | 9/2003 | Horton et al. | |
| 6,631,733 B2 | 10/2003 | Horton et al. | |
| 6,681,553 B2 | 1/2004 | Ferree et al. | |
| 6,766,633 B2 | 7/2004 | Wanie et al. | |
| 6,779,328 B2 | 8/2004 | Buss et al. | |
| 6,782,684 B2 | 8/2004 | Buss et al. | |
| 6,848,246 B2 | 2/2005 | Samejima et al. | |
| 6,877,302 B2 * | 4/2005 | Samejima et al. | 56/320.2 |
| 6,892,519 B2 | 5/2005 | Sugden et al. | |
| 6,996,962 B1 | 2/2006 | Sugden et al. | |
| 7,051,504 B2 * | 5/2006 | Osborne | 56/320.2 |
| 7,062,898 B2 | 6/2006 | Sarver et al. | |
| 7,065,946 B2 | 6/2006 | Boeck et al. | |
| 7,093,415 B2 | 8/2006 | Kallevig et al. | |
| 7,197,863 B1 | 4/2007 | Sugden | |
| 7,204,073 B1 * | 4/2007 | Chenevert | 56/320.2 |
| 7,237,374 B2 | 7/2007 | Sugden et al. | |
| 7,299,613 B2 | 11/2007 | Samejima et al. | |
| 7,360,352 B2 | 4/2008 | Samejima et al. | |
| 7,373,768 B2 | 5/2008 | Sugden et al. | |
| 7,437,865 B2 | 10/2008 | Koike et al. | |
| 7,448,194 B2 * | 11/2008 | Koike et al. | 56/320.1 |
| 7,458,199 B2 | 12/2008 | Sarver et al. | |
| 7,478,689 B1 | 1/2009 | Sugden et al. | |
| D590,844 S | 4/2009 | Eavenson, Sr. et al. | |
| 7,555,887 B2 | 7/2009 | Schick et al. | |
| 7,587,886 B1 | 9/2009 | Sugden | |
| 7,617,665 B2 | 11/2009 | Yamashita et al. | |
| 7,665,286 B2 | 2/2010 | Butler et al. | |
| 7,669,395 B2 | 3/2010 | Wehler et al. | |
| 7,677,022 B2 | 3/2010 | Chenevert et al. | |
| 7,685,799 B2 | 3/2010 | Samejima et al. | |
| 7,866,135 B2 | 1/2011 | Davis et al. | |
| 8,087,221 B2 * | 1/2012 | Sugio et al. | 56/16.8 |
| 2004/0255567 A1 * | 12/2004 | Kallevig et al. | 56/320.2 |

FOREIGN PATENT DOCUMENTS

| | | | |
|---|---|---|---|
| FR | 2643213 A1 | 8/1990 | |
| GB | 966347 A | 8/1964 | |
| JP | 57-082127 U | 5/1982 | |
| JP | 63-045136 U | 3/1988 | |
| JP | 63-143119 U | 9/1988 | |
| JP | 63-143120 U | 9/1988 | |
| JP | 63-186127 U | 11/1988 | |
| JP | 63-186216 U | 11/1988 | |
| JP | 63-193409 U | 12/1988 | |
| JP | 64-010913 A | 1/1989 | |
| JP | 64-011625 U | 1/1989 | |
| JP | 64-024916 U | 2/1989 | |
| JP | 64-049018 U | 3/1989 | |
| JP | 01-060633 U | 4/1989 | |
| JP | 05-055836 U | 7/1993 | |
| JP | 06-014634 A | 1/1994 | |
| JP | 06-014635 A | 1/1994 | |
| JP | 06-046636 A | 2/1994 | |
| JP | 06-046637 A | 2/1994 | |
| JP | 08-214660 A | 8/1996 | |
| JP | 08-242651 A | 9/1996 | |
| JP | 08-280225 A | 10/1996 | |
| JP | 2004-041060 A | 2/2004 | |
| WO | 9608955 A1 | 3/1996 | |

OTHER PUBLICATIONS

Installation Instruction Sheet for Textron Baffle Kits Nos. 970238, 970239, 970240, dated Nov. 2001, 2 pages.
Instruction Sheet for Commercial Grounds Care, Inc. Baffle Kits Nos. 970281, 970282, 970283, dated Apr. 2003, 2 pages.
Instruction Sheet for Commercial Grounds Care, Inc. 61" Mulching Kit, dated Jul. 2005, 5 pages.
Exmark product brochure, dated 1994, 7 pages.
Exmark LazerZ brochure, dated 1995, 2 pages.
Exmark product brochure, dated 1995, 10 pages.
Toro Groundsmaster 200 Series brochure, dated 2001, 6 pages.
Toro Groundsmaster 300 Series brochure, dated 2001, 6 pages.
Toro Groundsmaster 580-D brochure, dated 2004, 8 pages.
Toro Z Master G3 brochure, dated 2008, 6 pages.
Husqvarna PZ6034FX brochure, 1 page.
Encore service locator chart, 1 page.
Dixie Chopper brochure, 2 pages.
Excel Hustler 3 Way Deck brochure, 1 page.
Excel Hustler 275 brochure, 3 pages.
Excel Hustler Front-Mount Mower Specifications brochure, 2 pages.
Walker Mowers product line brochure, dated Jan. 1999, 1 page.
Bunton Variable-Drive Walker brochure, 1 page.
Kubota F2880/F3680 brochure, 8 pages.
Kubota F-Series (Front) Features brochure, 3 pages.
Features & Benefits Diagram of Xcaliber 74 mower deck, 1 page.
Selected images from the Japanese Publication "Farming Mechanization," Jun. 1995, 2 pages.
Selected images from the Japanese Publication "Farming Mechanization," Sep. 1991, 2 pages.
Selected images from the Japanese Publication "Farming Mechanization," Jul. 1985, 2 pages.
Selected images from the Japanese publication "Farmers' Business", 2 pages.
Selected images from "The Nokishinbun," (Farm Machine News), 5 pages.
Selected images from the Japanese publication "Agricultural Marketing Journal," Mar. 1995, 2 pages.
John Deere, 1400/1500 Series II Product Brochure, 1 page.
John Deere 7-Iron II Product Brochure, 1 page.
John Deere Mulch on Demand Product Brochure, 1 page.

* cited by examiner

MOWER BAFFLE SYSTEM

CROSS-REFERENCE TO RELATED APPLICATIONS

This application is entitled to and claims the benefit of the priority pursuant to 35 U.S.C. §119(e) of U.S. Provisional Patent Application No. 61/407,075, filed Oct. 27, 2010, the entire disclosure of which is hereby incorporated herein by reference.

BACKGROUND OF THE INVENTION

The present invention relates to a lawn mower having multiple rotary cutting blades and a mower baffle system. Further, the baffle system includes a first baffle positioned at the underside of a mower deck forwardly of the multiple rotary cutting blades and a second baffle positioned at the underside of the mower deck rearwardly of the multiple rotary cutting blades.

Commercial-type lawn mowers, whether they are walk-behind or riding mowers, normally include a mower deck having multiple rotary cutting blades positioned therein. The mower deck can be classified either as a mulching deck, a side discharge deck, a rear discharge deck or a bagging deck depending upon the manner in which the cut grass cuttings, clippings or discharge are handled or directed. When a mower is of the side discharge deck type, the grass clippings are discharged out one side of the deck and onto the ground.

Side discharge mower decks, however, can be problematic when the grass clippings are not sufficiently discharged or directed to the side discharge opening of the mower deck. This can lead to clumping or aggregation of grass clippings on the ground and/or buildup of grass clippings on the underside of the mower deck. Accordingly, there is still a need for a side discharge mower deck that can sufficiently direct and discharge grass clippings.

BRIEF SUMMARY OF THE INVENTION

In accordance with the present invention, the problem of controlling the flow of grass clippings is solved by engendering a mower baffle system that includes an elongated baffle system with an open throat portion for directing the flow of grass clippings from the rotary cutting blades to a discharge opening of the mower deck. As such, the present invention advantageously provides, for example, a better and improved cut, dispersal of clippings, and less blowout from under the mower deck.

In accordance with a first aspect, the present invention provides a mower deck that includes a top wall, a front wall, first and second side walls, and a discharge opening formed by the second side wall, and first and second cutting blades rotatably disposed within the mower deck. The rotation of each of the first and second cutting blades defines a circle. The mower deck also includes a mower baffle system mounted to an interior surface of the top wall. The mower baffle system includes a first baffle positioned between i) the first and second cutting blades and ii) the front wall for directing the flow of discharge to the discharge opening. The first baffle includes a first arcuate portion extending from the first side wall and partially around the circle defined by ends of the first cutting blade to a second arcuate portion having a radius of curvature smaller than a radius of curvature of the first arcuate portion. The second arcuate portion extends from the first arcuate portion to a third arcuate portion that extends partially around the circle defined by ends of the second cutting blade. The first and second arcuate portions each have a geometric center positioned on the same side of the first baffle.

In accordance with a second aspect, the present invention provide a mower deck that includes a top wall, a front wall, a rear wall, first and second side walls, a deck discharge opening formed by the second side wall, and first and second cutting blades rotatably disposed within the mower deck. Rotation of each of the first and second cutting blades defines a circle. The mower deck further includes a mower baffle system mounted to an interior surface of the top wall. The mower baffle system includes a first baffle, a second baffle and a third baffle. The first baffle is positioned between i) the first and second cutting blades and ii) the front wall. The first baffle includes a first arcuate portion extending from the first side wall and partially around the circle defined by ends of the first cutting blade to a second arcuate portion having a radius of curvature smaller than a radius of curvature of the first arcuate portion. The second arcuate portion extends from the first arcuate portion to a third arcuate portion that extends partially around the circle defined by ends of the second cutting blade. The first and second arcuate portions each have a geometric center positioned on the same side of the first baffle. The third baffle extends from adjacent the second side wall proximate to the discharge opening and into the circle defined by the second cutting blade in a chord-like fashion. The second baffle is positioned rearwardly of the first and second cutting blades and includes a plurality of semi-circular baffle portions adjacent, but radially beyond the circles defined by the ends of the first and second cutting blades. The first baffle, the second baffle, the third baffle, the rear wall, and the side walls define a baffle chamber. Further, the mower deck includes a baffle discharge opening of the baffle chamber formed by the first baffle and the third baffle, and spaced apart from the deck discharge opening.

In accordance with a third aspect, the present invention provides a mower deck that includes a top wall, a front wall, a rear wall, first and second side walls, a deck discharge opening formed by the second side wall, and first, second and third cutting blades rotatably disposed within the mower deck. Rotation of each of the first, second and third cutting blades defines a circle. The mower deck further includes a mower baffle system mounted to an interior surface of the top wall. The mower baffle system includes a first baffle, a second baffle, and a third baffle. The first baffle is positioned between i) the first, second and third cutting blades and ii) the front wall. The first baffle includes a first arcuate portion extending from the first side wall and partially around the circle defined by ends of the first cutting blade to a second arcuate portion. The second arcuate portion has a radius of curvature smaller than a radius of curvature of the first arcuate portion. The second arcuate portion extends from the first arcuate portion to a third arcuate portion. The third arcuate portion extends partially around the circle defined by ends of the second cutting blade. The third arcuate portion also extends from the second arcuate portion to a fourth arcuate portion. The fourth arcuate portion extends to a fifth arcuate portion, which extends partially around the circle defined by ends of the third cutting blade. The first and second arcuate portions each have a geometric center positioned on the same side of the first baffle. The third baffle extends from adjacent the second side wall proximate to the discharge opening and into the circle defined by the third cutting blade in a chord-like fashion. The second baffle is positioned rearwardly of the first, second and third cutting blades, and has a plurality of semi-circular baffle portions adjacent but radially beyond the circles defined by the ends of the first, second and third cutting blades. The first baffle, the second baffle, the third baffle, the rear wall, and the side walls define a baffle chamber. Further, the mower deck includes a baffle discharge opening of the baffle chamber formed by the first baffle and the third baffle, and spaced apart from the deck discharge opening.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the present invention is not limited to the precise arrangements and instrumentalities shown. In the drawings.

DETAILED DESCRIPTION OF THE INVENTION

Reference will now be made in detail to a preferred embodiment of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description should not be construed to limit the scope of the invention in any manner not explicitly set forth. Unless specifically set forth herein, the terms "a," "an" and "the" are not limited to one element but instead should be read as meaning "at least one." The terminology includes the words noted above, derivatives thereof and words of similar import.

Figure 1:
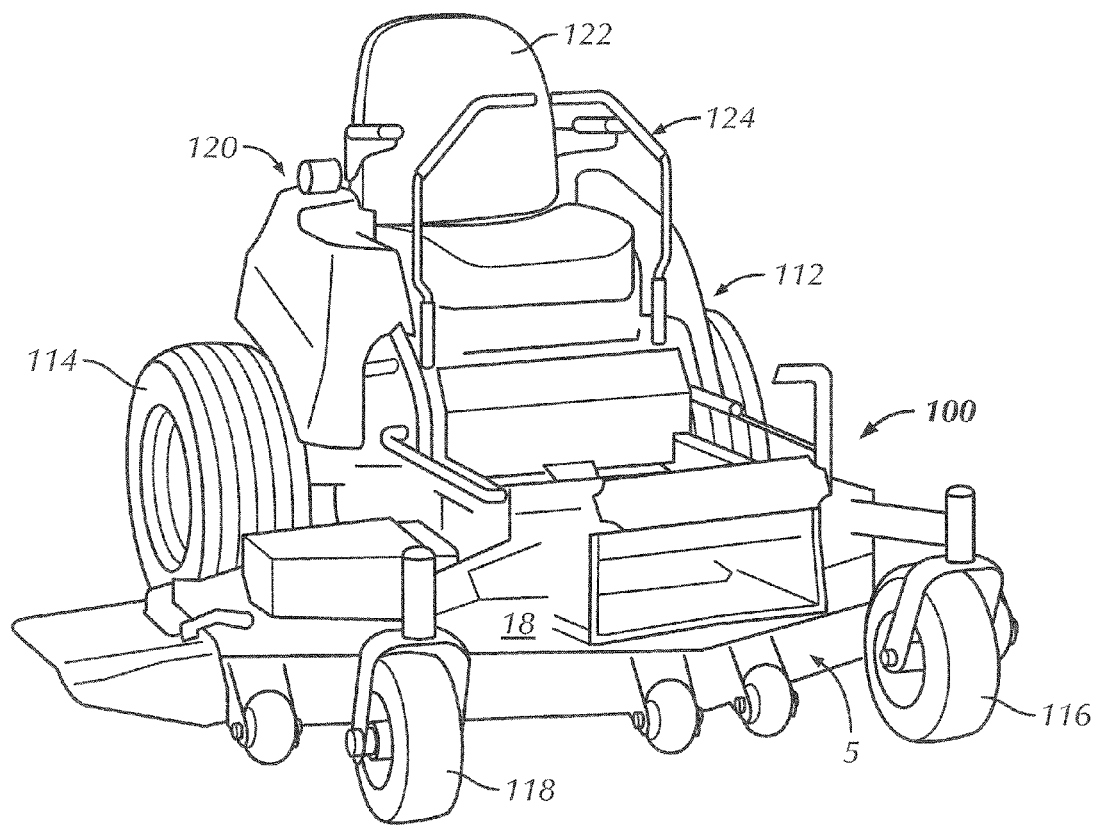
FIG. 1 is a front perspective view of a lawn mower having a mower deck in accordance with a preferred embodiment of the present invention.

Referring to FIG. 1, reference numeral 100 refers to a multiblade lawn mower upon which the preferred embodiment of the present invention of a mower deck 5 is mounted. The lawn mower 100 is shown to be a riding lawn mower, but it could also be a walk-behind or pull-type lawn mower. Lawn mower 100 generally includes a frame 112 having a pair of driven wheels 114 at the rear end thereof and at least one or more caster wheels 116, 118 at the forward end thereof. The lawn mower 100 also includes a conventional power means, such as an internal combustion engine 120, for driving the wheels 114 and for driving the cutting blades. An operator's station 122 is provided on the frame 112 to accommodate an operator. Conventional controls 124 are provided for controlling the operation of the lawn mower 100.

Mower deck 5 is mounted on the forward end of the frame 112 and, in the embodiment shown in the drawings, "floats" with respect to frame 112 in a generally conventional fashion. Mower deck 5 is configured as a side discharge mower deck which normally discharges the grass cuttings or clippings therefrom, for deposit on the ground at the right side of the lawn mower 100 (left side when viewing FIG. 1) or into some sort of collection container, bag (not shown), etc.

Figure 2:
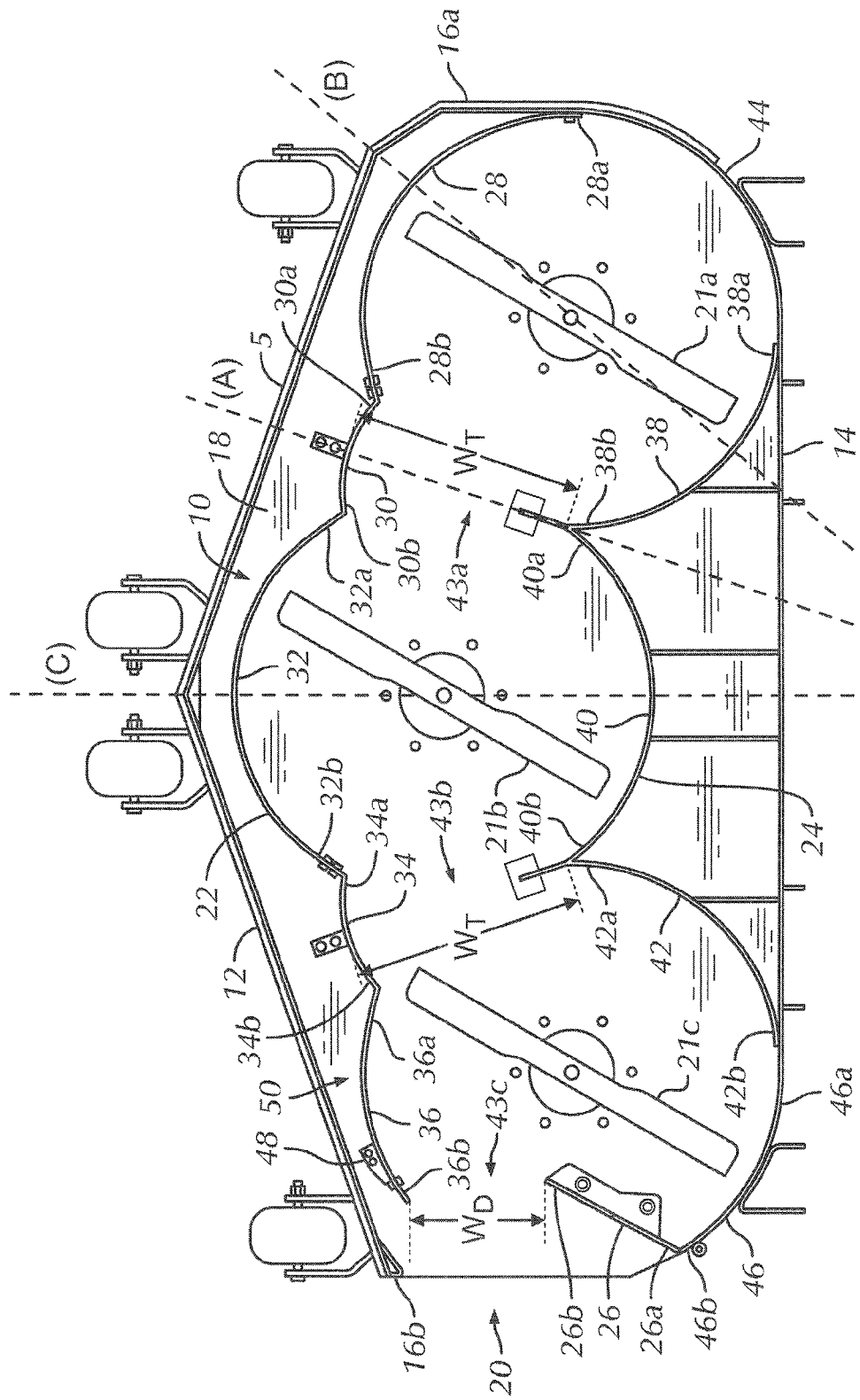
FIG. 2 is a bottom plan view of the mower deck of FIG. 1.
Figure 3:
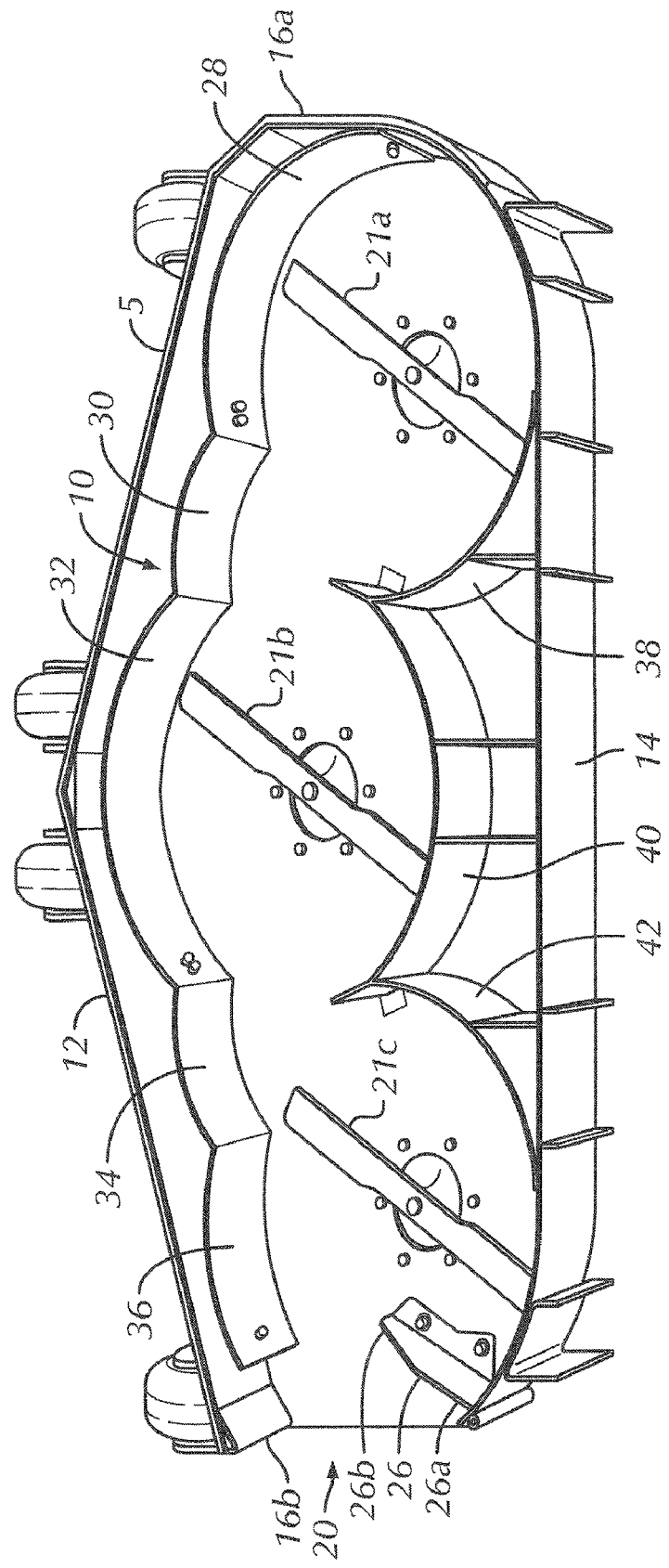
FIG. 3 is a bottom perspective view of the mower deck of FIG. 1.

FIGS. 2 and 3 illustrate a preferred embodiment of a mower baffle system 10 of the present invention for the mower deck 5. The mower deck 5 includes a front wall 12, a rear wall 14 and first and second side walls 16a, 16b, each depending substantially downwardly from the undersurface or interior a top wall 18 of the mower deck 5. The front, rear and side walls 12, 14, 16a, 16b preferably depend substantially downwardly from the top wall 18 about five (5) inches, but can depend more or less than five (5) inches. The mower deck 5 also includes a discharge opening 20 formed by the second side wall 16b about a side of the mower deck 5 opposite the first side wall 16a. Thus, the mower deck 5, as shown in FIG. 2, is configured as a right-sided discharge mower deck (i.e., when viewed from the operator station 122). However, the mower deck 5 can alternatively be configured as a left-sided discharge mower deck.

The mower deck 5 includes at least two rotating cutting blades i.e., first and second cutting blades 21a, 21b rotatably disposed within the mower deck 5. However, the mower deck 5 can optionally be configured to include more than two, such as e.g., a third cutting blade 21c. The first and second cutting blades 21a, 21b, are adjacently spaced apart so as to both rotate without interfering with each other's respective blade rotation. The radially outer ends of the first and second cutting blades 21a, 21b each define a circle upon rotation thereof. Rotation of the cutting blades 21a, 21b is driven by the conventional power means 120 with a suitable known transmission (not shown) of the lawn mower 100.

The first rotating cutting blade 21a is positioned between the front and rear walls 12, 14 and adjacent the first side wall 16a. The second rotating cutting blade 21b is positioned between the front and rear walls 12, 14 and adjacent the first rotating cutting blade 21a, but preferably at a position slightly forward (i.e., closer to the front wall 12) of the first rotating cutting blade 21a.

When the mower deck 5 is configured with a third rotating cutting blade 21c, the third rotating cutting blade 21c is preferably positioned between the front and rear walls 12, 14 and slightly rearward of the second rotating cutting blade 21b (i.e. closer to the rear wall 14) and/or horizontally inline with the position of the first rotating cutting blade 21a, when viewed as shown in FIG. 2. Preferably, the plurality of rotating cutting blades 21a, 21b, 21c are configured to rotate in the same direction. When viewed as shown in FIG. 2, the plurality of rotating cutting blades 21a, 21b, 21c are all configured to rotate in the counterclockwise direction.

The mower baffle system 10 is mounted to the underside of the mower deck 5 so as to depend from the top wall 18. That is, the mower baffle system 10 is mounted to an interior surface of the top wall 18. The mower baffle system 10 includes a first or front baffle 22, a second or rear baffle 24 and a third or discharge baffle 26. The first, second and third baffles 22, 24, 26 function as flow control baffles for controlling the direction and flow of grass clipping for discharging out through the discharge opening 20 in a manner in which even cutting of grass occurs regardless of the type of grass being cut.

The first, second and third baffles 22, 24, 26 can be formed out of any suitable material, such as, a metal (e.g., steel) or a rigid, durable polymer or plastic. The first, second and third baffles 22, 24, 26 are also preferably formed as sheets of material configured and shaped, as described herein.

The first baffle 22 is positioned between the plurality of cutting blades e.g., 21a, 21b, and the front wall 12 for directing the flow of discharge to the discharge opening 20. The first baffle 22 includes a first arcuate portion 28 having a first end 28a and a second end 28b. The first arcuate portion 28 is configured to substantially match the overall profile of a circle defined by the peripheral ends of the first cutting blade 21a in rotation, but at least slightly spaced apart therefrom such that the first arcuate portion 28 and the circle defined by the peripheral ends of the first cutting blade 21a in rotation share substantially the same geometric center. Preferably, the first cutting blade 21a is spaced apart from the first arcuate portion 28 about ¾ to 1 inch and preferably about ⅛ to ½ inch, but can be spaced apart more or less. The first end 28a is positioned adjacent the first sidewall 16a, while the remainder of the first arcuate portion 28 extends substantially around the circumferential portion of the circular blade tip path defined by the peripheral ends of the first cutting blade 21a in rotation and terminating at the second end 28b. Preferably, the first end 28a of the first arcuate portion 28 is secured to the first sidewall 16 using a fastener. Preferably, the first arcuate portion 28 extends from adjacent a vertical tangency with the first sidewall 16, as shown in FIG. 2, to an arc distance of about 90 to 135 degrees, preferably about 100 to 120 degrees, and most preferably about 110 to 118 degrees.

Extending from the second end 28b of the first arcuate portion 28 is a second arcuate portion 30 having a first end 30a and a second end 30b. The first end 30a is secured or connected to and extends from the second end 28b of the first arcuate portion 28. The second arcuate portion 30 preferably has a radius of curvature that is smaller than the radius of curvature of the first arcuate portion 28 and extends in a direction away from the first arcuate portion 28 that is slightly forward (i.e., anterior) and to the left of the first arcuate portion 28, as shown in FIG. 2. That is, the second arcuate portion 30 is preferably configured to have a geometric center that is further above (i.e., anterior) and to the left of the geometric center of the first arcuate portion 28, when viewed as shown in FIG. 2. The radius of curvature of the second arcuate portion 30 is preferably about 40% to 80%, more preferably about 45% to 60%, and most preferably about 50% of the radius of curvature of the first arcuate portion 28. The second arcuate portion 30 is also curved in substantially the same direction as that of the first arcuate portion 28, such that the geometric centers of the first and second arcuate portions 28, 30 are on the same side of the first baffle 22. In addition, the second arcuate portion 30 has a line of symmetry (A) that is angled with respect to a line of symmetry (B) of the first arcuate portion 28. The line of symmetry (A) is preferably angled with respect to the line of symmetry (B) about 1 to 20 degrees, more preferably about 5 to 15 degrees and most preferably about 8 to 12 degrees. Preferably, the second arcuate portion 30 extends an arc distance of about 50 to 100 degrees, and more preferably about 60 to 90 degrees, but could be longer or shorter.

Extending from the second end 30b of the second arcuate portion 30 is a third arcuate portion 32 having a first end 32a and a second end 32b. The third arcuate portion 32 is configured to substantially match the overall profile of a circle defined by the peripheral ends of the second cutting blade 21b in rotation, but is spaced apart therefrom, such that the third arcuate portion 32 and the circle defined by the peripheral ends of the second cutting blade 21b in rotation share substantially the same geometric center. Preferably, the second cutting blade 21b is at least slightly spaced apart from the third arcuate portion 32 about ¾ to 1 inch and preferably about ⅛ to ½ inch, but can be spaced apart more or less. The first end 32a is connected to and extends from the second end 30b of the second arcuate portion 30, while the remainder of the third arcuate portion 30 extends substantially around the circumferential portion of a circular blade tip path defined by the second cutting blade 21b in rotation and terminates at the second end 32b.

In sum, the first arcuate portion 28 extends from the first sidewall 16a partially around the circle defined by the ends of the first cutting blade 21a to the second arcuate portion 30 having a radius of curvature that is smaller than a radius of curvature of the first arcuate portion 28. The second arcuate portion 30 extends from the first arcuate portion 28 to the third arcuate portion 32 that extends partially around the circle defined by the peripheral ends of the second cutting blade 21b. The first, second and third arcuate portions 28, 30, 32 each have a geometric center positioned on the same side of the first baffle 22.

When the mower deck 5 is configured as a three blade mower deck (as shown) having first, second and third rotating cutting blades 21a, 21b, 21c, the first baffle 22 includes a fourth arcuate portion 34 and a fifth arcuate portion 36. In this configuration, the third arcuate portion 32 can extend an arc distance of about 100 to 150 degrees, and preferably about 120 to 130 degrees, but can also extend an arc distance more than 150 degrees or less than 100 degrees. The third arcuate portion 32 is also configured to have a line of symmetry (C) that is angled with respect to the line of symmetry (A) of the second arcuate portion 30. The line of symmetry (C) is preferably angled with respect to the line of symmetry (A) about 10 to 30 degrees, more preferably about 15 to 25 degrees and most preferably about 18 to 23 degrees.

The fourth arcuate portion 34 includes a first end 34a and a second end 34b, and is similarly configured as a mirror image of the second arcuate portion 30 taken along the line of symmetry (C) of the third arcuate portion 32. Likewise, the first end 34a of the fourth arcuate portion 34 extends from and is secured to the second end 32b of the third arcuate portion 32.

The fifth arcuate portion 36 includes a first end 36a and a second end 36b, and extends from and is secured to the fourth arcuate portion 34. The fifth arcuate portion 36 is configured to match the overall profile of a circle defined by the peripheral ends of the third cutting blade 21c in rotation, but is at least slightly spaced apart therefrom, such that the fifth arcuate portion 36 and the circle defined by the peripheral ends of the third cutting blade 21c in rotation share substantially the same geometric center. Preferably, the third cutting blade 21c is spaced apart from the fifth arcuate portion 36 about ¾ to 1 inch and preferably about ⅛ to ½ inch, but can be spaced apart more or less. The first end 36a is connected to and extends from the second end 34b of the fourth arcuate portion 34, while the second end 36b extends substantially around the circumferential portion of a circular blade tip path defined by the third rotating cutting blade 21c. Preferably, the fifth arcuate portion 36 extends an arc length of about 35 to 65 degrees and more preferably about 45 to 60 degrees, but could be longer or shorter, such as, about 30 to 70 degrees.

In sum, the first, second, third, fourth and fifth arcuate portions 28, 30, 32, 34, 36 collectively form the first or front baffle 22. The first baffle 22 extends from adjacent the first sidewall 16a to adjacent the discharge opening 20. Preferably, the first baffle 22 extends such that the second end 36b of the fifth arcuate portion 36 is at least slightly spaced apart from the discharge opening 20. More preferably, the second end 36b is spaced apart from the discharge opening 20 about four (4) inches, but can alternatively be spaced apart from the discharge opening 20 more or less than four (4) inches, such as about 2 to 12 inches. Alternatively, the second end 36b can be spaced from the discharge opening 20 a length approximately ½ the length of a radius defining the circular path defined by the third rotating cutting blade 21c.

The second baffle 24 is positioned rearwardly (or posterior) of the cutting blades e.g., 21a-c and extends downwardly from the underside or interior surface of the top wall 18. The second baffle 24 may be welded, bolted or otherwise secured to the top wall 18 as desired. The second baffle 24 is comprised of three substantially semi-circular baffle portions 38, 40, 42. The first semi-circular baffle portion 38 is preferably configured to have a first end 38a that is adjacent to and tangent with respect to the rear wall 14 and which extends forwardly about an arc distance of about 90 degrees (i.e., about a quarter round). Alternatively, the first semi-circular baffle portion 38 can be configured to extend to the first side wall 16a. The overall profile of the first semi-circular baffle portion 38 is configured to match the overall profile of the circle defined by the first cutting blade 21a in rotation, but is at least slightly spaced apart therefrom, such that the first semi-circular baffle portion 38 and the circle defined by the first rotating cutting blade 21a share substantially the same geometric center. Preferably, the first rotating cutting blade 21a is spaced apart from the first semi-circular baffle portion 38 about ¾ to 1 inch and preferably about ⅛ to ½ inch, but can be spaced apart more or less. Preferably the first end 38a is secured to the real wall 14.

The second semi-circular baffle portion 40 has a first end 40a that extends from and is secured to a second end 38b of the first semi-circular baffle portion 38. The second semi-circular baffle portion 40 has an overall profile that is configured to match the overall profile of the a posterior section of a circle defined by the peripheral ends of the second cutting blade 21b in rotation, but is positioned spaced apart therefrom, such that the second semi-circular baffle portion 40 and the circle defined by the second cutting blade 21b in rotation share substantially the same geometric center. Preferably, the second rotating cutting blade 21b is spaced apart from the second semi-circular baffle portion 40 about ¾ to 1 inch and preferably about ⅛ to ½ inch, but can be spaced apart more or less. The second semi-circular baffle portion 40 extends an arc distance of about 100 to 125 degrees, and more preferably about 105 to 115 degrees, but can be more or less.

The first and second baffles 22, 24 define at least one open throat portion 43a that is positioned between adjacent rotating cutting blades, such as 21a and 21b. The throat portion 43a allows for the flow of grass chippings from one rotating cutting blade to an adjacent downstream rotating cutting blade. When the mower deck 5 is configured as a three blade mower deck, a second throat portion 43b is formed by the first and second baffles 22, 24 and positioned between adjacent rotating cutting blades, such as 21b and 21c.

The width of the throat portion e.g., 43a is defined by the second arcuate portion 30 and the second baffle 24. In the present embodiment, it is the intersection of the first and second semi-circular baffle portions 38, 40 that define the width of the throat portion 43a in conjunction with an apex of the second arcuate portion 30. Due to the convex curved configuration and position of the second arcuate portion 30, it advantageously provides for a larger width or opening of the throat portion 43a compared to conventional side discharge baffle systems without a convex curved second arcuate portion. The larger width or larger throat portion allows for more air and thus better flow and movement of grass discharge from an upstream cutting blade to a downstream cutting blade and ultimately to the discharge opening 20.

Additionally, another aspect of the present invention relates to the second arcuate portion 30 and the second baffle 24 forming a throat portion 43a positioned between the first and second cutting blades 21a, 21b having an opening width $W_T$ that is larger than a width $W_D$ of a baffle discharge opening 43c (further described below) and/or the discharge opening 20.

The third semi-circular baffle portion 42 has a first end 42a that is connected to and extends from a second end 40b of the second semi-circular baffle portion 40b. The third semi-circular baffle portion 42 is substantially configured as a mirror image of the first semi-circular baffle portion 38 taken along the line of symmetry (C). A second end 42b of the third baffle portion 42 engages and is secured to the rear wall 14.

In sum, the second baffle 24 is positioned rearwardly (posterior) of the first and second cutting blades 21a, 21b. The second baffle 24 also has at least two semi-circular baffle portions (e.g., 38, 40) adjacent, but radially beyond the circles defined by the ends of the first and second cutting blades 21a, 21b, respectively.

The rear corners 44, 46 of the mower deck 5 are also rounded and form continuations of the second baffle 24, as shown in FIG. 2. For example, for a three blade mower deck configuration, the rear corner 44 extends, about 50 to 70 degrees and preferably about 60 degrees, to connect to the rear wall 14 and/or the first semi-circular baffle portion 38 about one end and the first side wall 16a about its opposite end. The rear corner 46 has a first end 46a and a second end 46b. The first end 46a is connected to and extends from the rear wall 14 and/or the third semi-circular baffle portion 42 an arc distance of about 90 degrees, such that its second end 46b forms part of the mower deck's discharge opening 20.

The third baffle 26 includes a first end 26a and a second end 26b. The first end 26a extends from the second end 46b of the rear corner 46 into the circular path defined by the ends of the cutting blade adjacent the discharge opening 20, such as rotating blade 21c, as shown in FIG. 2. The third baffle 26 extends into the circular path defined by the ends of the cutting blade 21c in a chord-like fashion. Preferably, the third baffle 26 has a length substantially the same as or less than that of a radius length of the rotating blade (e.g., 21c) adjacent the discharge opening 20. Furthermore, the height of the third baffle 26 extending from the top wall 18 is shorter than the distance the cutting blade 21c is spaced from the top wall 18 so as not to interfere with the rotational operation of the cutting blade 21c. That is, the third baffle 26 depends downwardly from the top wall 18 and is spaced from the cutting blade adjacent the discharge opening 20 (e.g., the second cutting blade 21b for a two blade mower deck or the third cutting blade 21c for a three blade mower deck) sufficiently to allow for the cutting blade adjacent the discharge opening to rotate without engaging the third baffle 26. Additionally, the third baffle 26 can optionally be configured with a tapered second end 26b that tapers as it extends in a direction into the circle defined by the cutting blade adjacent the discharge opening 20. The third baffle 26 is also preferably oriented to extend in a direction so as to form an acute angle with respect to the discharge opening 20 or in a chord-like fashion that extends forwardly of a center of the circle defined by the cutting blade adjacent the discharge opening 20.

In sum, the third baffle 26 extends from adjacent the second side wall 16b proximate the discharge opening 20 and into the circle defined the ends of the cutting blade adjacent the discharge opening (e.g., the second cutting blade 21b for a two blade mower deck or the third cutting blade 21c for a three blade mower deck) in a chord-like fashion. In other words, the third baffle 26 has its first end 26a adjacent the second side wall 16b and extends in the forward (anterior) direction such that the second end 26b is within the circle defined by the ends of the cutting blade adjacent the discharge opening (e.g., the second cutting blade 21b for a two blade mower deck or the third cutting blade 21c for a three blade mower deck) and positioned to extend forwardly at least as far as an axis of rotation of the cutting blade adjacent the discharge opening.

Put another way, the third baffle 26 extends from adjacent the discharge opening 20 and into the circle defined by e.g., the second cutting blade 21b defining a baffle discharge opening 43c (as further described below) spaced from the discharge opening 20.

Each of the first, second and third baffles 22, 24, 26 are attached to the top wall 18 so as to depend substantially downwardly therefrom, defining a baffle chamber 50. The first and second baffles 22, 24, preferably depend substantially downwardly from the top wall 18 about 2 to 6 inches, and more preferably about 3.5 inches. Further, the first and second baffles 22, 24 are configured to depend downwardly from the top wall 18 a distance substantially the same as a distance the rotating cutting blades 21a, 21b, 21c are positioned from the top wall 18. However, the depending length of the first and second baffles 22, 24 can be more or less than the distance the rotating cutting blades 21a, 21b, 21c are positioned from the top wall 18. Furthermore, the first and second baffles 22, 24 are preferably configured to depend downwardly from the top wall 18 a distance less than or equal to the depending length of the mower deck's front, rear and side walls 12, 14, 16a and 16b. The first and second baffles 22, 24 can be attached to the top wall 18 by one or more fasteners 48, such as a nut and bolt via a flange portion 48 extending from the baffles. Each of the first and second baffles 22, 24 can be configured as a unitary baffle or as individual segments that are assembled together to form the overall length of the baffles.

As shown in FIG. 2, the end of the first baffle 22 adjacent the discharge opening 20 and the second end 26b of the third baffle 26 define another throat portion or a baffle discharge opening 43c. The baffle discharge opening 43c is spaced apart from the discharge opening 20, preferably about 1 to 10 inches, more preferably about 2 to 8 inches, and most preferably about 4 to 6 inches. In sum, the baffle discharge opening 43a of the baffle chamber 50 is formed by the third arcuate portion 36 and the third baffle 26, and is spaced apart from the mower deck discharge opening 20. The baffle discharge opening 43c advantageously facilitates the flow and discharge of grass clippings from the cutting blade adjacent the discharge opening 20 to the discharge opening 20. The third baffle 26 also directs the flow of discharge from the baffle discharge opening 43c to the mower deck discharge opening 20.

In accordance with another aspect, the present invention provides a mower 100 that includes the mower deck 5, as described above. The mower 100 also includes a means to operatively connect to the mower deck 5 to move the mower deck 5 along the ground. Such means to move the mover deck 5 can include, for example and not by way of limitation, an internal combustion engine or via a manual pushing or pulling of the mower 100 by a person.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

We claim:

1. A mower deck comprising:
    a top wall, a front wall, first and second side walls, and a discharge opening formed by the second side wall;
    first and second cutting blades rotatably disposed within the mower deck, wherein rotation of each of the first and second cutting blades defines a circle; and
    a mower baffle system mounted to an interior surface of the top wall, the mower baffle system includes a first baffle positioned between i) the first and second cutting blades and ii) the front wall for directing the flow of discharge to the discharge opening, the first baffle having:
        a first arcuate portion extending from the first side wall and partially around the circle defined by ends of the first cutting blade to a second arcuate portion having a radius of curvature smaller than a radius of curvature of the first arcuate portion, the second arcuate portion extending from the first arcuate portion to a third arcuate portion that extends partially around the circle defined by ends of the second cutting blade, wherein the first, second and third arcuate portions each have a geometric center positioned on the same side of the first baffle.

2. The mower deck of claim 1, wherein the mower baffle system further includes a third baffle extending from adjacent the second side wall proximate to the discharge opening and into the circle defined by the second cutting blade in a chord-like fashion.

3. The mower deck of claim 2, wherein the third baffle has a first end adjacent the second side wall and extends in the forward direction such that a second end of the second baffle is within the circle defined by the ends of the second cutting blade and positioned forward of an axis of rotation of the second cutting blade.

4. The mower deck of claim 2, wherein the mower baffle system further includes a second baffle positioned rearwardly of the first and second cutting blades, the second baffle having at least two semi-circular baffle portions adjacent but radially beyond the circles defined by the ends of the first and second cutting blades.

5. The mower deck of claim 2, wherein the third baffle is shorter than the first baffle.

6. The mower deck of claim 2, wherein the third baffle depends downwardly from the top wall and is spaced from the second cutting blade sufficiently to allow for the second cutting blade to rotate without engaging the third baffle.

7. The mower deck of claim 1, wherein the mower baffle system further includes a third baffle extending from adjacent the discharge opening and into the circle defined by the second cutting blade defining a baffle discharge opening spaced from the discharge opening.

8. The mower deck of claim 7, wherein the mower baffle system further includes a second baffle positioned rearwardly of the first and second cutting blades, the second baffle having at least two semi-circular baffle portions adjacent but radially beyond the circles defined by the ends of the first and second cutting blades, and
    wherein the second arcuate portion and the second baffle form a throat portion positioned between the first and second cutting blades having a width that is larger than a width of the baffle discharge opening.

9. The mower deck of claim 1, further comprising:
    a third cutting blade rotatably disposed within the mower deck, wherein rotation of the third cutting blade defines a circle, wherein the first baffle further includes a fourth arcuate portion extending from the third arcuate portion and a fifth arcuate portion that extends from the fourth arcuate portion partially around the circle defined by ends of the third cutting blade; and
    a third baffle extending from adjacent the second side wall proximate to the discharge opening and into the circle defined by the third cutting blade in a chord-like fashion.

10. The mower deck of claim 9, wherein the third baffle extends from adjacent the discharge opening and into the circle defined by the third cutting blade defining a baffle discharge opening spaced from the discharge opening.

11. A mower comprising:
the mower deck of claim 1; and
a means operatively connected to the mower deck for moving the mower deck along the ground.

12. A mower comprising:
the mower deck of claim 9; and
a means operatively connected to the mower deck for moving the mower deck along the ground.

13. A mower deck comprising:
a top wall, a front wall, a rear wall, first and second side walls and a deck discharge opening formed by the second side wall;
first and second cutting blades rotatably disposed within the mower deck, wherein rotation of each of the first and second cutting blades defines a circle; and
a mower baffle system mounted to an interior surface of the top wall, the mower baffle system includes:
a first baffle positioned between i) the first and second cutting blades and ii) the front wall, the first baffle having a first arcuate portion extending from the first side wall and partially around the circle defined by ends of the first cutting blade to a second arcuate portion having a radius of curvature smaller than a radius of curvature of the first arcuate portion, the second arcuate portion extending from the first arcuate portion to a third arcuate portion that extends partially around the circle defined by ends of the second cutting blade, wherein the first and second arcuate portions each have a geometric center positioned on the same side of the first baffle,
a third baffle extending from adjacent the second side wall proximate to the discharge opening and into the circle defined by the second cutting blade in a chord-like fashion,
a second baffle positioned rearwardly of the first and second cutting blades, the second baffle having a plurality of semi-circular baffle portions adjacent but radially beyond the circles defined by the ends of the first and second cutting blades, wherein the first baffle, the second baffle, the third baffle, the rear wall, and the side walls define a baffle chamber, and
a baffle discharge opening of the baffle chamber formed by the first baffle and the third baffle, and spaced apart from the mower deck discharge opening.

14. The mower deck of claim 13, wherein the third baffle directs the flow of discharge from the baffle discharge opening to the mower deck discharge opening.

15. The mower deck of claim 13, wherein the second arcuate portion and the second baffle form a throat portion positioned between the first and second cutting blades having a width that is larger than a width of the baffle discharge opening.

16. The mower deck of claim 13, wherein third baffle is shorter than the first baffle.

17. A mower comprising:
the mower deck of claim 13; and
a means operatively connected to the mower deck for moving the mower deck along the ground.

18. A mower deck comprising:
a top wall, a front wall, a rear wall, first and second side walls and a deck discharge opening formed by the second side wall;
first, second and third cutting blades rotatably disposed within the mower deck, wherein rotation of each of the first, second and third cutting blades defines a circle; and
a mower baffle system mounted to an interior surface of the top wall, the mower baffle system includes:
a first baffle positioned between i) the first, second and third cutting blades and ii) the front wall, the first baffle having a first arcuate portion extending from the first side wall and partially around the circle defined by ends of the first cutting blade to a second arcuate portion having a radius of curvature smaller than a radius of curvature of the first arcuate portion, the second arcuate portion extending from the first arcuate portion to a third arcuate portion that extends partially around the circle defined by ends of the second cutting blade, the third arcuate portion extending from the second arcuate portion to a fourth arcuate portion, which extends to a fifth arcuate portion extending partially around the circle defined by ends of the third cutting blade, wherein the first and second arcuate portions each have a geometric center positioned on the same side of the first baffle,
a third baffle extending from adjacent the second side wall proximate to the discharge opening and into the circle defined by the third cutting blade in a chord-like fashion,
a second baffle positioned rearwardly of the first, second and third cutting blades, the second baffle having a plurality of semi-circular baffle portions adjacent but radially beyond the circles defined by the ends of the first, second and third cutting blades, wherein the first baffle, the second baffle, the third baffle, the rear wall, and the side walls define a baffle chamber, and
a baffle discharge opening of the baffle chamber formed by the first baffle and the third baffle, and spaced apart from the deck discharge opening.

19. The mower deck of claim 18, wherein the fourth arcuate portion and the second baffle form a throat portion positioned between the second and third cutting blades having a width that is larger than a width of the baffle discharge opening.

20. A mower comprising:
the mower deck of claim 18; and
a means operatively connected to the mower deck for moving the mower deck along the ground.

* * * * *